(12) United States Patent
Kanzler et al.

(10) Patent No.: US 7,244,055 B2
(45) Date of Patent: Jul. 17, 2007

(54) HEADLIGHT FOR MOTOR VEHICLE

(75) Inventors: Josef Kanzler, Emmersdorf (AT);
Alfred Scheichelbauer, Wieselburg (AT)

(73) Assignee: Zizala Lichtsysteme GmbH, Wieselburg (AT)

( * ) Notice: Subject to any disclaimer, the term of this patent is extended or adjusted under 35 U.S.C. 154(b) by 0 days.

(21) Appl. No.: 11/247,823

(22) Filed: Oct. 11, 2005

(65) Prior Publication Data
US 2006/0083014 A1    Apr. 20, 2006

(30) Foreign Application Priority Data
Oct. 14, 2004    (AT)    ............... A 1723/2004

(51) Int. Cl.
*F21V 7/00*    (2006.01)
(52) U.S. Cl. ........................ 362/514; 362/476
(58) Field of Classification Search ............... 362/459, 362/460, 464, 465, 469, 473, 475, 476, 514
See application file for complete search history.

(56) References Cited

U.S. PATENT DOCUMENTS

| | | | | |
|---|---|---|---|---|
| 4,868,720 A | * | 9/1989 | Miyauchi et al. | 362/466 |
| 5,060,120 A | * | 10/1991 | Kobayashi et al. | 362/465 |
| 5,426,571 A | * | 6/1995 | Jones | 362/466 |
| 5,599,085 A | * | 2/1997 | Tabata et al. | 362/475 |
| 6,341,884 B1 | | 1/2002 | Leleve et al. | |
| 7,055,993 B2 | * | 6/2006 | Farrow et al. | 362/469 |
| 2001/0000448 A1 | * | 4/2001 | Suzuki et al. | 362/512 |
| 2004/0246732 A1 | * | 12/2004 | Lewis | 362/475 |

FOREIGN PATENT DOCUMENTS

DE    198 17 348 A1    10/1999

* cited by examiner

*Primary Examiner*—Renee Luebke
*Assistant Examiner*—Mary Zettl
(74) *Attorney, Agent, or Firm*—Anton P Ness; Fox Rothschild LLP

(57) ABSTRACT

An illumination device for single-track motor vehicles that emits bundled light in the form of a light beam bundle, that in a first propagation direction (A) is aimed at the roadway area located in front of the motor vehicle. The illumination device (SCH) comprises a light module (LIM) that emits light in a second propagation direction (B) and where at least one optical reflection device (SPI) is arranged in the beam path of the light. Light emitted by the light module (LIM), first of all, will hit the optical reflection device (SPI) and then will be deflected by the latter into the first propagation direction (A). At least one optical reflection device (SPI) can be swung around at least one swing axis. According to the invention, at least one swing axis (SA1) lies essentially in a plane that extends parallel to the longitudinal vehicle midplane (FLE) or that is the longitudinal vehicle midplane (FLE).

12 Claims, 7 Drawing Sheets

HEADLIGHT FOR MOTOR VEHICLE

CROSS-REFERENCE TO RELATED APPLICATIONS

This application claims priority from Austrian Patent Application No. A 1723/2004 filed Oct. 14, 2004.

FIELD OF THE INVENTION

This invention relates to an illumination device for motor vehicles, and more particularly for single-track motor vehicles.

BACKGROUND OF THE INVENTION

An illumination device for motor vehicles is known from DE 198 17 348 A1. The headlight presented there makes it possible, among other things, to regulate the width of illumination in that the optical reflection device can be swung around a horizontal axis that is positioned particularly with respect to the longitudinal axis of the vehicle. Besides, segments of the optical reflection device can be swung around another axis so that by swinging these segments, one can provide a curved light for multi-track motor vehicles.

A problem is also encountered in the case of single-track motor vehicles, such as motorcycles, as they are driven around curves due to the inclination of the vehicle. As a rule, a headlight that is rigidly connected with the motorcycle or with the fork of the motorcycle can no longer illuminate the roadway in front of the motorcycle in an optimum fashion. There are various approaches in the state of the art to remedy this problem; by way of example, it might be mentioned that one can make provision for positioning the entire headlight in the motorcycle in an accordingly movable manner so that it can be swung simply upon the inclination of the motorcycle. This is disadvantageous since the positioning of the entire headlight in the motorcycle is expensive and awkward, and also, since the entire headlight must be swung when driving around a curve. As a result, one must move a relatively great mass, the movement becomes slow, and furthermore, much structural space is required.

The headlight disclosed in DE 198 17 348 A1 likewise does not make it possible to solve the general complex problem of light distribution while driving around a curve with a single-track motor vehicle; this is so because, due to the swinging only of segments, light is still not deflected accordingly and gets into unnecessary areas on the roadway. This results mainly from the following fact: the headlight disclosed in DE 198 17 348 A1 is intended for multi-track vehicles where, as they are driven around curves, one does not encounter the complex problem connected with the inclination of the vehicle but rather the actual "concomitant steering" of the light distribution in accordance with the steering deflection of the vehicle.

BRIEF SUMMARY OF THE INVENTION

The present invention is an illumination device for a single-track motor vehicle by means of which one can generate a "curved light," which can be produced in a simple and reasonably priced manner and which can be mounted in the motor vehicle where minimum possible parts must be moved and by means of which one can balance out the inclination of the single-track vehicle with a view to light distribution. The present device for single-track motor vehicles emits light in the form of a light beam bundle, which, in a first propagation direction, is aimed at the roadway area located in front of the motor vehicle, where the illumination device comprises a light module that emits light in a second propagation direction, where at least one optical reflection device is arranged in the beam path of the light, and where the light emitted by the light module will first of all hit the optical reflection device and then will be deflected by the latter into the first propagation direction.

This is accomplished in the following manner with a first embodiment of vehicle headlight: according to the invention, the entire optical reflection device can be swung can be swung around at least one swing axis, where this swing axis essentially lies in a plane that extends parallel to the longitudinal midplane of the vehicle or is the longitudinal midplane of the vehicle. If, when driving along a curve, the motor vehicle inclines into the curve, then only the reflection device, which reflects the light from the light module upon the roadway, is inclined around the swing axis so that the light image on the roadway is accordingly adapted. It is now no longer necessary to swing the entire illumination device, as is the case in the state of the art. By swinging the entire optical reflection device, one can make sure that the entire light image is swung accordingly and not just parts thereof. That prevents undesirable disturbing effects in the light distribution that is adapted to the inclination of the vehicle.

By longitudinal vehicle midplane, we mean here a plane extending through the longitudinal axis of the vehicle, which, as the vehicle is driven straight ahead, is a vertical plane. In order further to explain the longitudinal vehicle midplane, reference is made to FIG. 12, where that plane is labeled FLE. To provide good illumination of the roadway in front of the vehicle, it is provided that the projection of the swing axis into the longitudinal vehicle midplane be inclined at an angle against the longitudinal axis of the vehicle. Illumination is particularly good when this angle corresponds roughly to half the angle that is formed by the optical axis of the light module with the longitudinal axis of the vehicle. A typical value for the angle between the optical axis of the light module and the longitudinal vehicle axis is 45°. This is the optimum choice for that angle because, in this case, one requires little structural space in order to get an optimum light image. We thus get a typical value of 22.5° for the angle between the swing axis and the longitudinal axis of the vehicle. Basically, however, deviations of about ±10° (as regards the angle between the light module and the longitudinal vehicle axis) are conceivable and partly also necessary depending on the structural situation. Looking at it in optical terms, even greater deviations should be possible.

In a specific embodiment, it is provided that the swing axis in a rear area facing toward the light module be positioned lower than a forward area looking in the direction of light emission.

To be able to use a reflection device with small dimensions, it is furthermore advantageous when the swing axis extends close to the reflecting surface or immediately through the surface of the reflection device. It is furthermore provided that the reflecting surface of the reflection device be level and that the swing axis extend parallel to the surface of the reflection device. In that way, one can achieve a high degree of light reflection amounting to up to 98%. Furthermore, for the sake of adaptation of the light distribution, it might also be a good idea to provide a structure, for example, a ribbing on the reflecting surface of the reflection device. This structure in this case can cover the surface also only partially.

Furthermore, along its edges, the reflection device of the present invention can be adapted accordingly to the contour of the housing or a covering disc, etc., so that, in other words, the latter need not necessarily be straight. To be able to generate an optimum light image while driving around a curve, especially in order to be able to correct and correspondingly adapt the light image also with a view to the width of illumination, it is furthermore provided that there be arranged an additional swing axis for the purpose of swinging the reflection device, whereby the swing axis essentially is positioned perpendicularly with respect to the longitudinal vehicle. midplane. This axis preferably is positioned here as closely as possible to the lens of the light module so that only little structural space would be required for the entire headlight. In this described variant, one can, with the help of two motors for the swinging movements around the two swing axes, implement three functions, that is to say, a roll angle adjustment, a curved light and an illumination width regulation of the light image. In another variant, the swing axis can be swung out of the plane that is parallel to, or is, the longitudinal midplane of the vehicle, whereby at least one point on the swing axis remains in that plane. In this variant, the entire group of functions can be accomplished with only one motor, which results in a reasonably priced model.

With regard to practical implementation, the optical reflection device of the present invention is rotatably positioned in a rear area facing toward the light module and it is guided in a front area in a guide, while, outside the plane that is parallel to, or is, the longitudinal vehicle midplane, an adjusting means is engaged with the optical reflection device; the guide is such that, when the adjusting element is adjusted, the optical reflection device, on the one hand, is rotated around the swing axis and, on the other hand, the swing axis is rotated around the rear pivot out of the plane. Basically, it is, however, also possible to position the reflection device forward and to guide it in the rear. Typically, the guide is U-shaped or V-shaped.

In another embodiment, a reflection device is provided in the beam path of the light, where the second reflection device can be swung around an axis that is positioned essentially perpendicularly with respect to the longitudinal vehicle midplane. Specifically, the second reflection device is so arranged that light, emerging in the second propagation direction out of the light module, will first of all hit the second reflection device, will be directed by the latter upon the first reflection device, and the light will be radiated from the first reflection device into the first propagation direction out of the illumination device.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
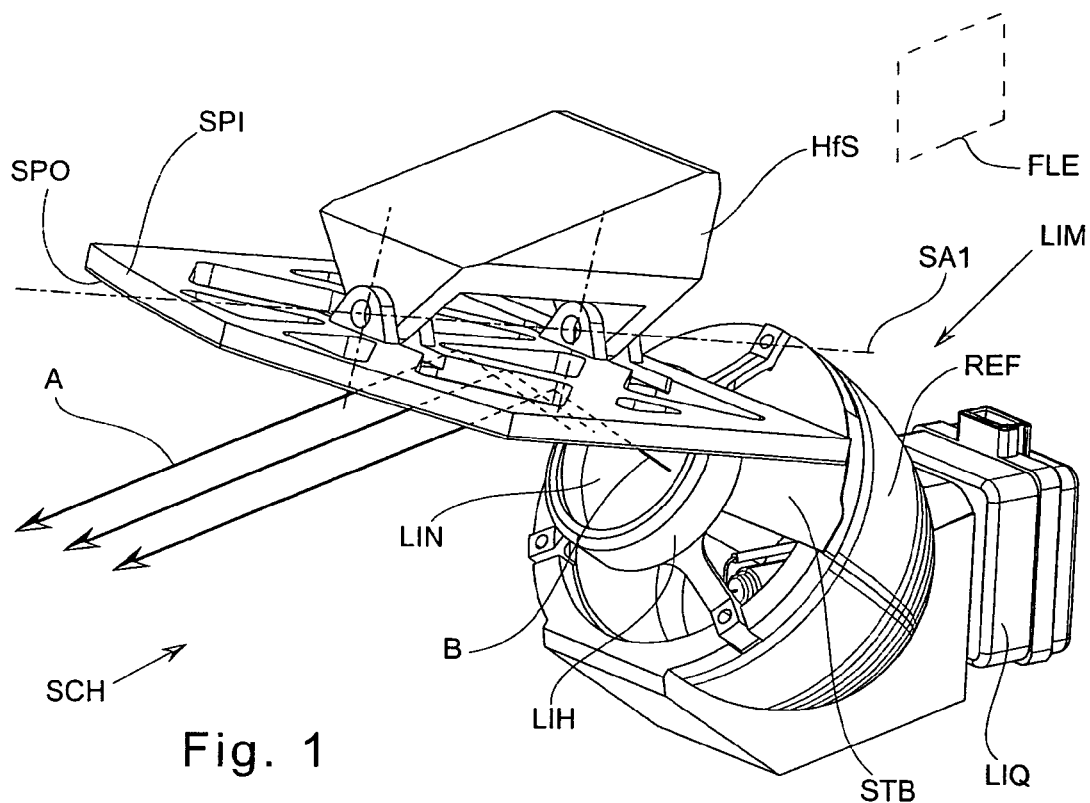
FIG. 1 is a perspective view of a vehicle headlight of the present invention obliquely from above forward.
Figure 2:
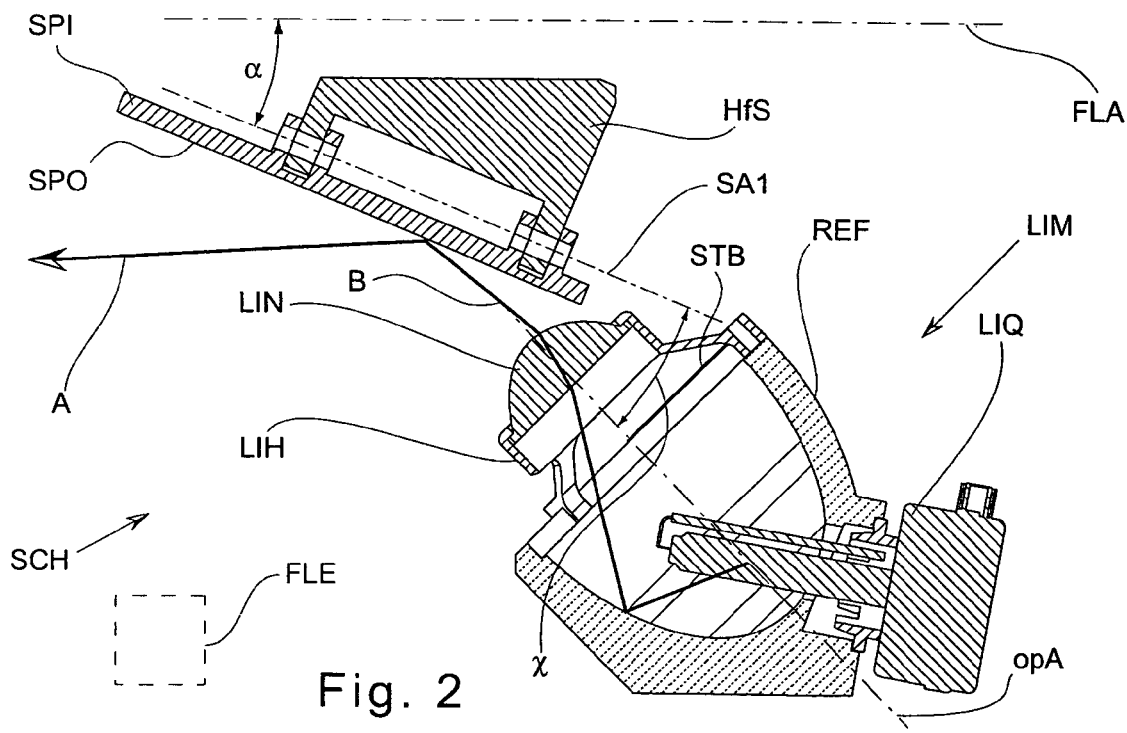
FIG. 2 is a vertical profile through a headlight according to FIG. 1 along the longitudinal vehicle axis.
Figure 3:
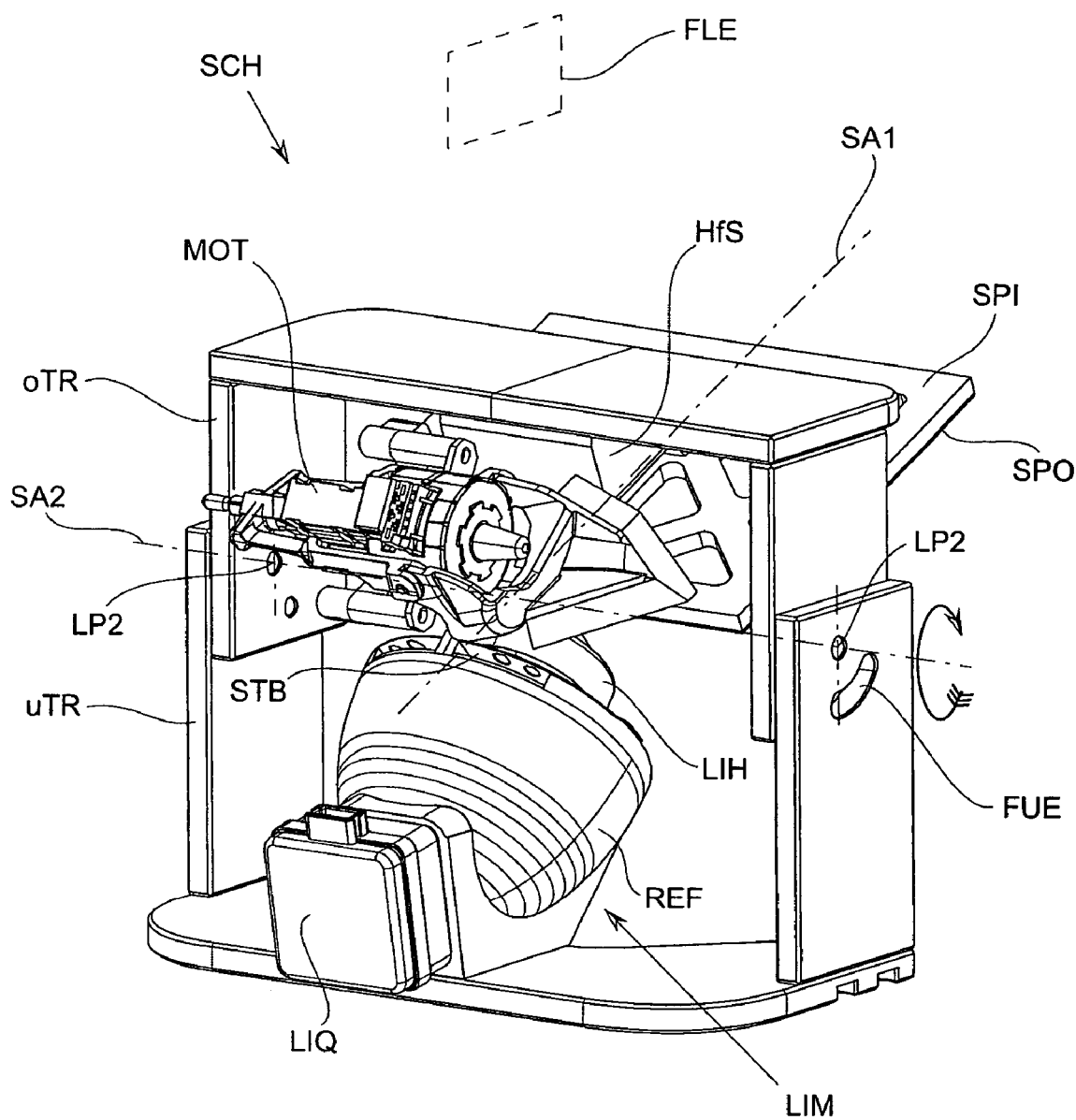
FIG. 3 is a perspective view of a basic structure of an invention-based vehicle headlight obliquely from the rear.
Figure 4:
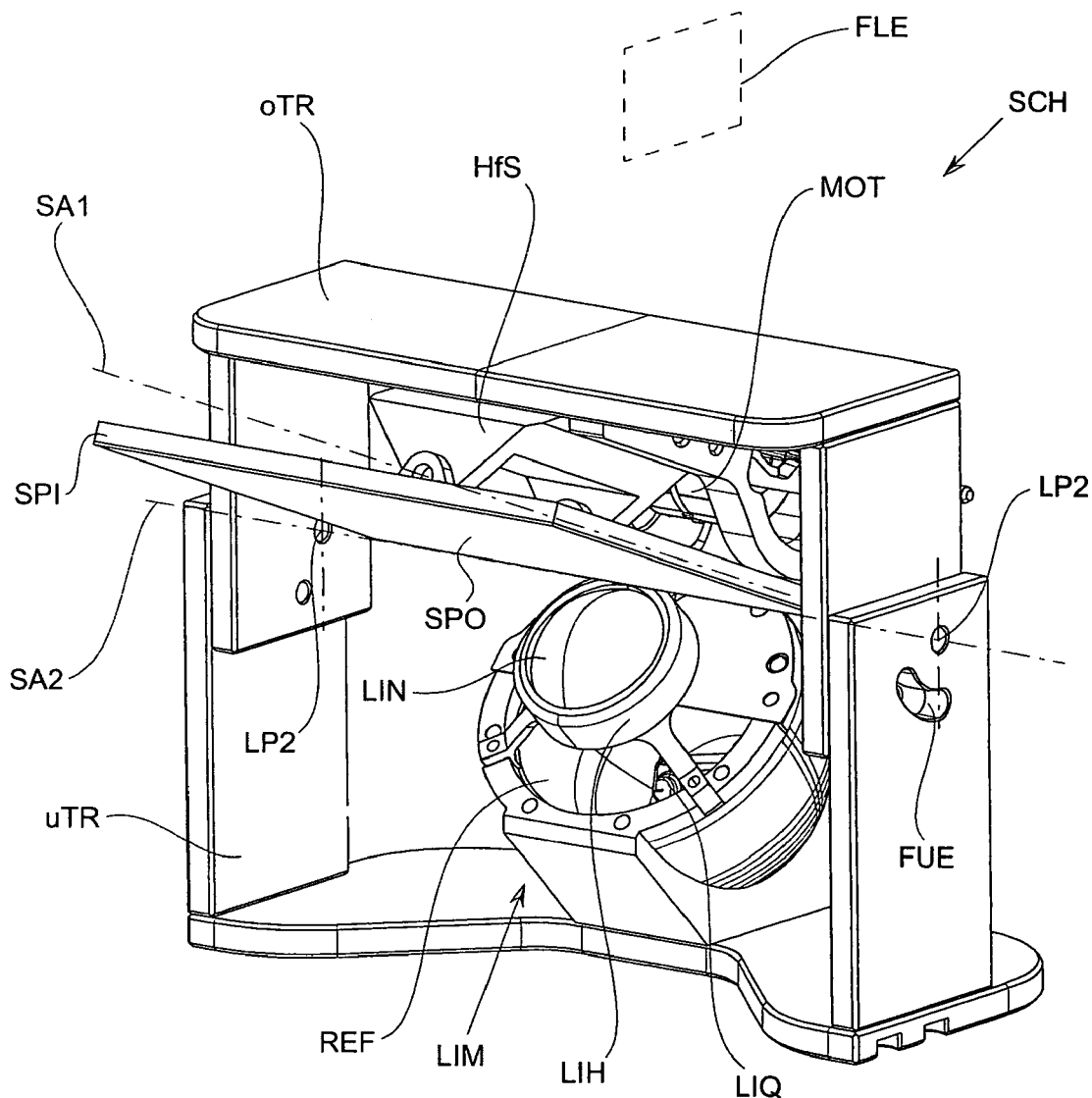
FIG. 4 is a perspective view of the vehicle headlight from FIG. 3 from obliquely forward.
Figure 5:
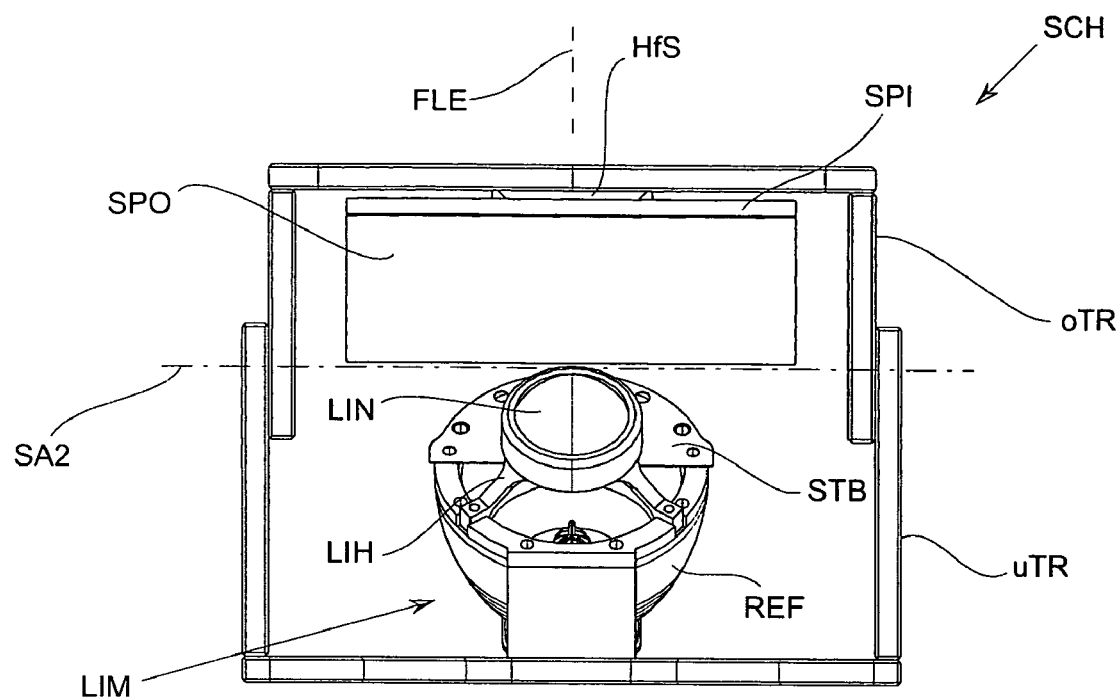
FIG. 5 is a view of the vehicle headlight from FIG. 3 viewed from forward as the vehicle is being driven straight forward.

In the drawings, like numerals indicate like elements throughout. In the drawings, like numerals indicate like elements throughout. Certain terminology is used herein for convenience only and is not to be taken as a limitation on the present invention. The embodiments illustrated below are not intended to be exhaustive or to limit the invention to the precise form disclosed. These embodiments are chosen and described to best explain the principle of the invention and its application and practical use and to enable others skilled in the art to best utilize the invention.

FIGS. 1 to 6 show an illumination device of the present invention in the form of a vehicle headlight for single-track motor vehicles. The illumination device or vehicle headlight SCH consists of a light module LIM, which, in the embodiment shown, is made as a projection headlight. In the embodiment shown, light module LIM thus comprises a light source LIQ, a (main) reflector REF, a lens LIN and a beam screen STB for the purpose of switching between high-beam and low-beam light. Lens LIN is retained by means of a lens holder LIH upon reflector REF of the light module LIM. The entire illumination device SCH is arranged in a fixed manner in a housing (not shown) closed by means of a covering disc or a headlight lens, and built into the motor vehicle in a corresponding opening.

Light module LIM emits light in the form of a light beam bundle that is directed in a first propagation direction A—the main reflection direction of the illumination device—by the headlight lens or covering disc (not shown in the drawing) upon the roadway area located in front of the motor vehicle. As the vehicle is driven straight forward, the propagation direction A and the optical axis opA of the light module LIM will lie in a vertical plane, as a rule, in the longitudinal vehicle midplane FLE, which extends through the longitudinal vehicle axis FLA. This longitudinal vehicle midplane FLE represents a vertical plane as the vehicle is being driven straight forward.

A first optical reflection device SPI is arranged in the beam path of the light between the headlight lens or covering disc and the light module LIM. In the embodiment shown, the reflection device SPI consists of a mirror or reflector, that is to say, a mirror or reflector with a surface SPO that reflects in a level manner; but this can also be a mirror or reflector with, for example, a curved surface.

Light emitted by the light module LIM emerges out of light module LIM in a second propagation direction B, falls upon the reflection device SPI and is diverted by the optical reflection device SPI in the propagation direction of the light beam bundle into the first propagation device A. The entire optical reflection device SPI can be swung at least around one swing axis SA1, which essentially is located in a plane that extends parallel to the longitudinal vehicle midplane FLE or which is the longitudinal vehicle midplane FLE.

Furthermore, the swing axis SA1 has a directional component, which essentially extends in the direction of the longitudinal vehicle axis FLA. Basically, the swing axis can extend parallel to the longitudinal vehicle axis FLA, but optimum illumination is achieved when the projection of the swing axis SA1 is inclined into the longitudinal vehicle midplane at an angle $\alpha$ against the longitudinal vehicle axis FLA. Angle $\alpha$ (in FIG. 2) is approximately but preferably exactly half the angle $\delta$ (see FIG. 10), whereby $\delta$ designates angles which are assumed by the optical axis opA of the light module LIM with the longitudinal vehicle axis, in other words, $\alpha=\delta/2$. A typical value is $\delta=45°$, where larger deviations than those mentioned initially are possible. Light module LIM or the optical axis opA of the light module LIM and the swing axis SA1 form an angle $\chi$. The swing axis is so arranged here that the swing axis SA1 lies deeper in a rear area facing toward the light module LIM than in an area that is forward when looking in the direction of light discharge.

As one can further gather from the Figures, swing axis SA1 extends close to the reflecting surface SPO or runs immediately through the surface SPO of the reflection device. This is a good idea because, in that case, one requires only little space for the swing motion of the reflection device SPI. Besides, swinging will not result in any, or only minor, optical changes in the photometry within the tolerances in the light image.

As mentioned earlier, it is a good idea when the reflecting surface SPO of the reflection device SPI is level because such a surface can be made in a simple and reasonably priced manner, and furthermore, the swing axis SA1 extends parallel to the surface SPO of the reflection device SPI. Furthermore, illumination device SCH has yet another swing axis SA2 for swinging the reflection device SPI, whereby the swing axis SA2 is essentially positioned perpendicularly upon the longitudinal vehicle midplane FLE.

In the illustrated, nonrestrictive embodiment of the invention, the optical reflection device SPI can be swung along an upper carrying frame part oTR around the first axis SA1. A drive MOT, as a rule, a motor, is provided for the swinging action. The upper carrying frame part oTR can be swung around the bearing points LP2 upon a lower carrying frame part uTR around the second axis SA2 for which purpose there is provided another drive (motor), not shown.

Figure 8:
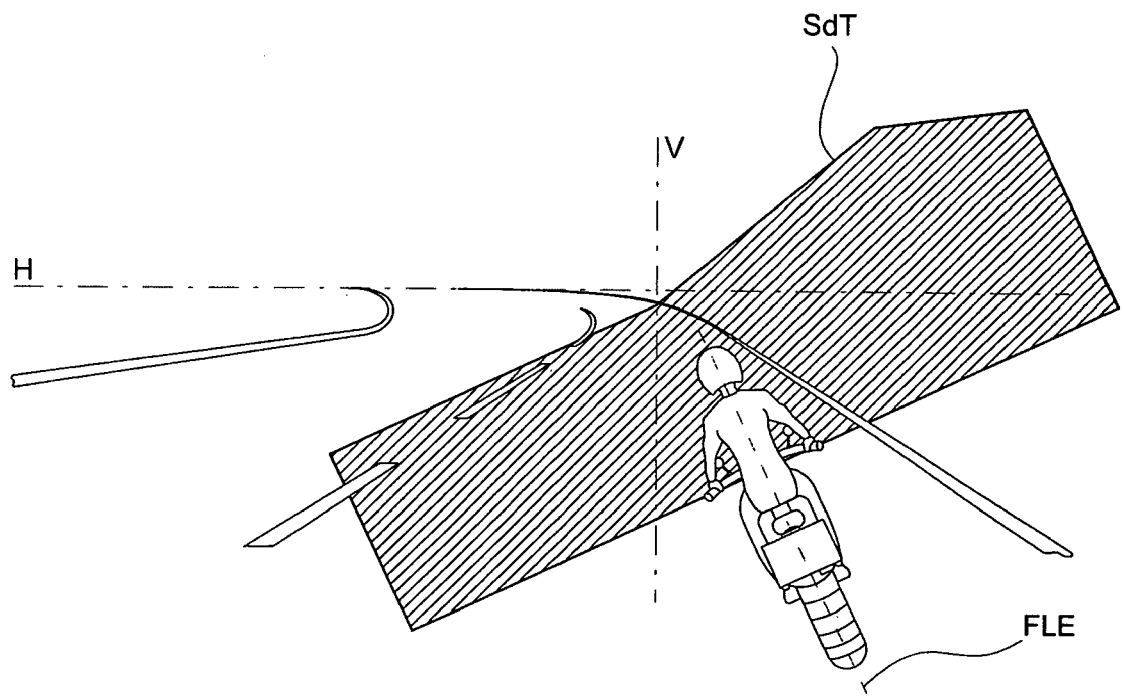
FIG. 8 is a diagram illustrating a light image distribution while a single-track motor vehicle is being driven along a curve with a PRIOR ART vehicle headlight.

FIG. 8 is an illustration showing a motorcycle being driven along a curved, equipped with a headlight according to the PRIOR ART. Such a headlight can be simulated with the help of the invention-based headlight SCH in that, as the vehicle is driven along a curve, there is no swinging around the axes SA1, SA2. In this case, we get an illustrated SdT as shown in FIG. 8, that is to say, the curve itself is illuminated more poorly and, on the other hand, the illustration (in this case, on the right side next to the roadway, whereas in case of a curve to the right, it is the side of the oncoming traffic) displays a segment of light distribution that definitely goes beyond the horizontal H.

Figure 6:
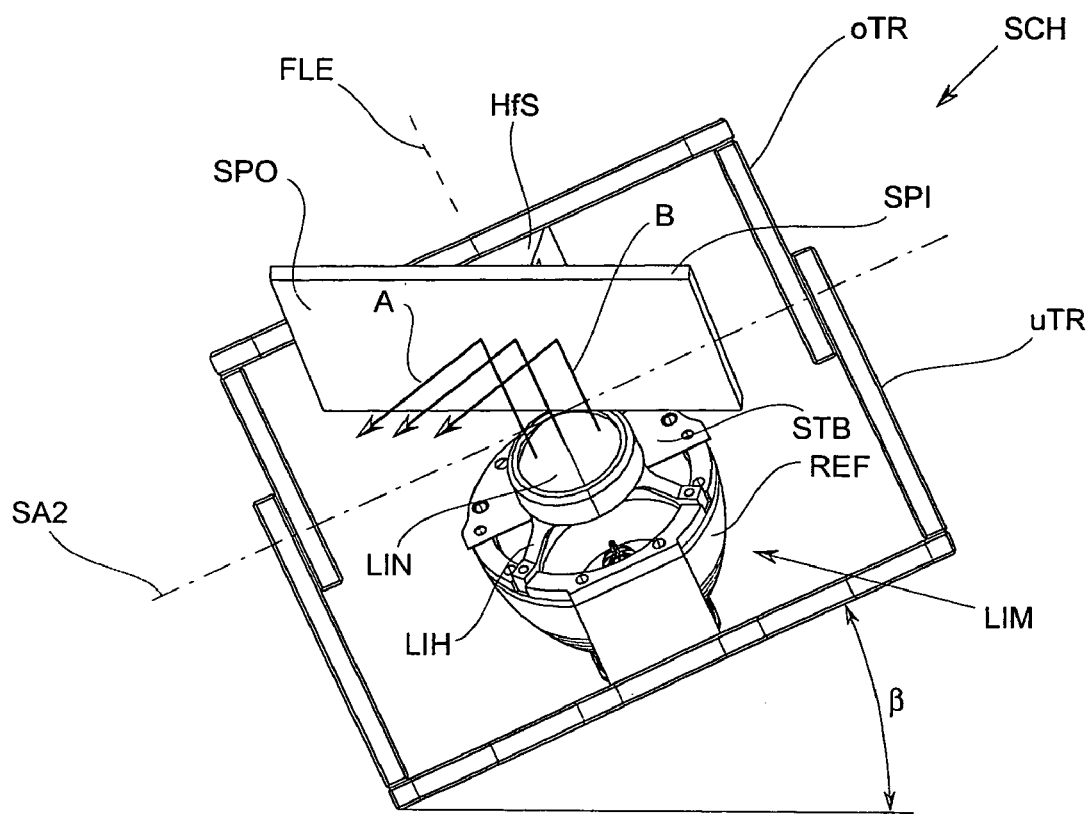
FIG. 6 is a view of the vehicle headlight from FIGS. 3 to 5, looking at it from forward while the vehicle is being driven along a curve.

If, on the other hand, when one uses an invention-based illumination device SCH the motorcycle is inclined by an angle $\beta$ (see FIGS. 6 and 7), then, of course, the housing of the illumination device is also inclined, as is the light module LIM, and in the case shown according to FIG. 6, also the lower and the upper bearing frame parts uTR, oTR that are inclined around that angle $\beta$. Corresponding to the inclination angle $\beta$ of the motorcycle, however, the reflection device SPI is now also swung specifically around the first swing axis, as shown in FIG. 6, so that the light distribution can illuminate the curve in an optimum fashion. The swinging action here takes place in the direction opposite to the inclination angle $\beta$ of the motor vehicle. The reflection device here, as a rule, is swung by angle $\beta/2$ around the swinging axis SA1. When driving around a curve, the mirror is thus typically not positioned parallel to a horizontal plane.

Figure 7:
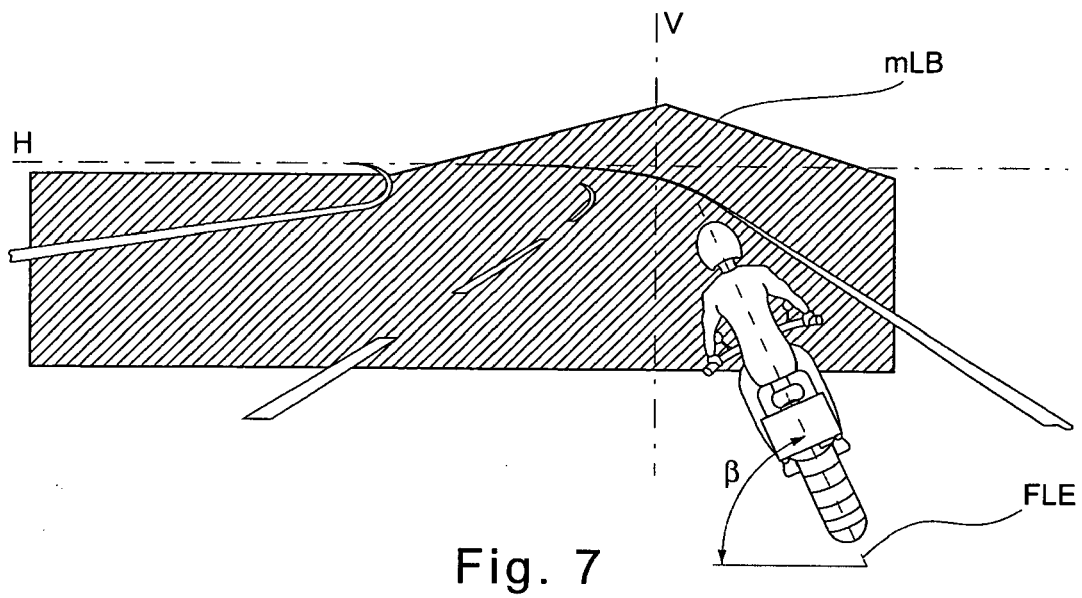
FIG. 7 is a diagram illustrating a light image distribution with the vehicle headlight of the present invention while a single-track motor vehicle is being driven along a curve.

To prevent any possible lowering of the light image as a result of this swing around axis SA1, it is furthermore provided that the reflection device SPI be swung around the second axis SA2 forward in the direction of light emission, so that the light image is lifted. The swinging action here is accomplished by a second motor that is not shown in the drawing. The correspondingly resulting light image mLB is illustrated in FIG. 7. If the inclination $\beta$ declines again as the motorcycle is straightened up, then the reflection device will again be swung back both around SA1 and SA2.

The inclination angle of the vehicle can be determined by various already known techniques; for example, it can be determined via ultrasound or gyroscopically. As a parameter for adjusting the reflection device, one can, in addition to the angle $\beta$, also feed in, for example, a speed signal and/or an acceleration signal. Of course, the invention shown also makes it possible so to adapt the light image that one can also balance out the brake diving. The same applies also in case of strong acceleration where automatic illumination width regulation is also possible.

One can implement three functions, that is to say, a roll angle adjustment, a curved light, and an illumination width regulation of the light image in this known variant with the help of two motors for the swinging motions around the two swing axes.

Figure 9:
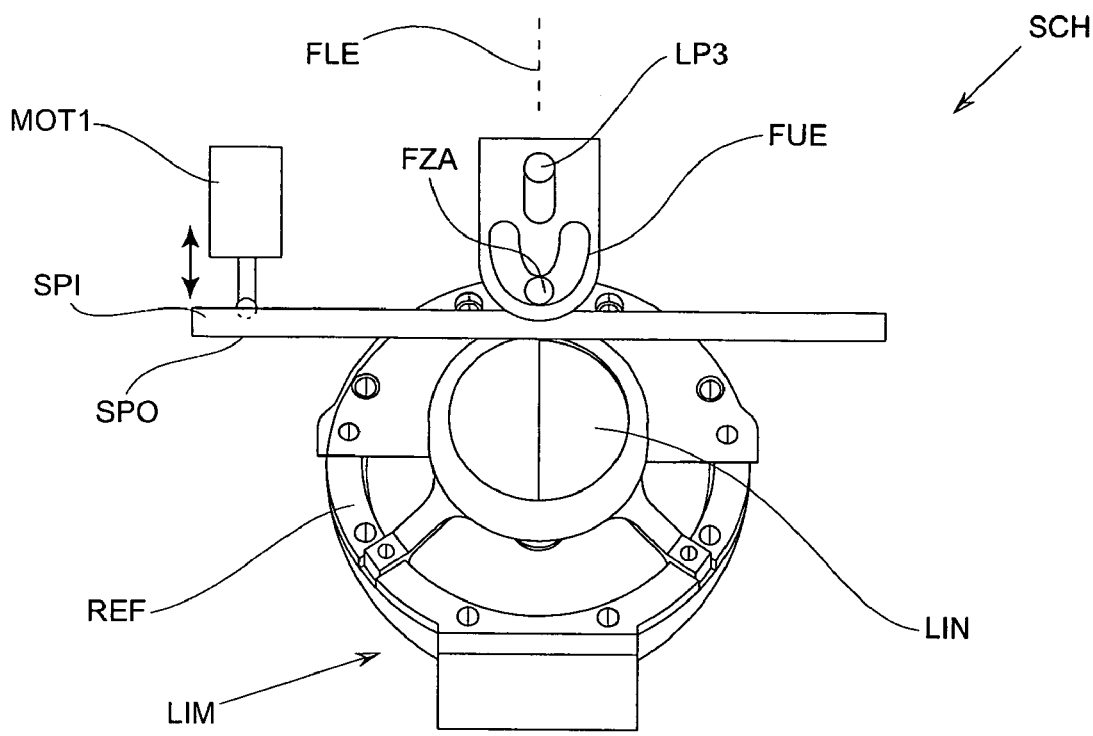
FIG. 9 is a front view of yet another embodiment of an invention-based vehicle headlight.
Figure 10:
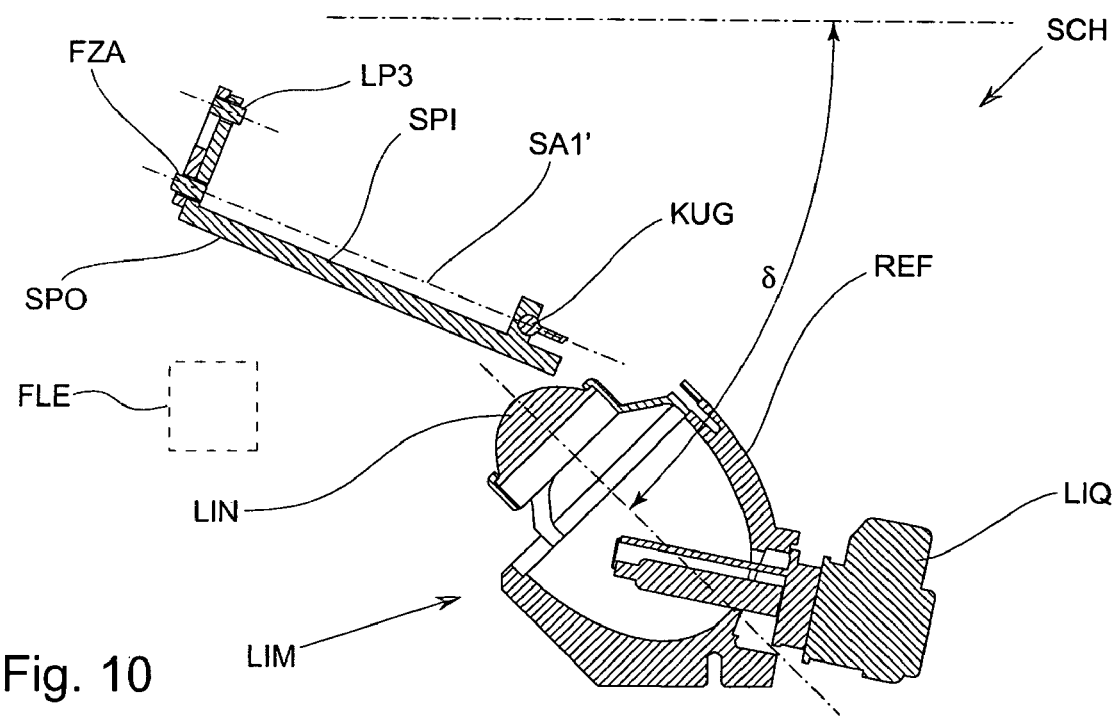
FIG. 10 is a profile through the headlight from FIG. 9 along the longitudinal vehicle midplane.

Another variant of the invention is shown in FIGS. 9 and 10, where one needs only one motor MOT1 to implement the invention-based properties of the headlight SCH. Here, the swing axis SA1' can be swung laterally out of the plane that is parallel to, or is, the longitudinal vehicle midplane FLE, whereby at least one point of the swing axis SA1' will remain in that plane. In a practical implementation, the optical reflection device SPI is rotatably positioned in a rear area facing toward the light module LIM in a bearing point KUG that is made as a ball and a guide peg FZA is guided in a forward area in a guide FUE. Laterally, outside the plane that is parallel to, or is, the longitudinal vehicle midplane FLE, there engages an adjusting means in the form of a linear motor MOT1 upon the optical reflection device SPI and the guide FUE is such, that is to say, for example, in U-shape or V-shape, that during an adjusting action with the adjusting element MOT1, the optical reflection device SPI, on the one hand, will be rotated around the swing axis SA1' and, on the other hand, the swing axis SA1' will be rotated out of the plane around the rear pivot KUG.

To increase the stability, the optical reflection device SPI is furthermore guided in a longitudinal hole by means of a bearing element LP3. Bearing element LP3 is pressed downward by spring force and makes sure that the peg FZA will sit without play in the guide FUE. Peg FZA can also be made in the form of a roll in order to minimize the friction resistance.

Figure 11:
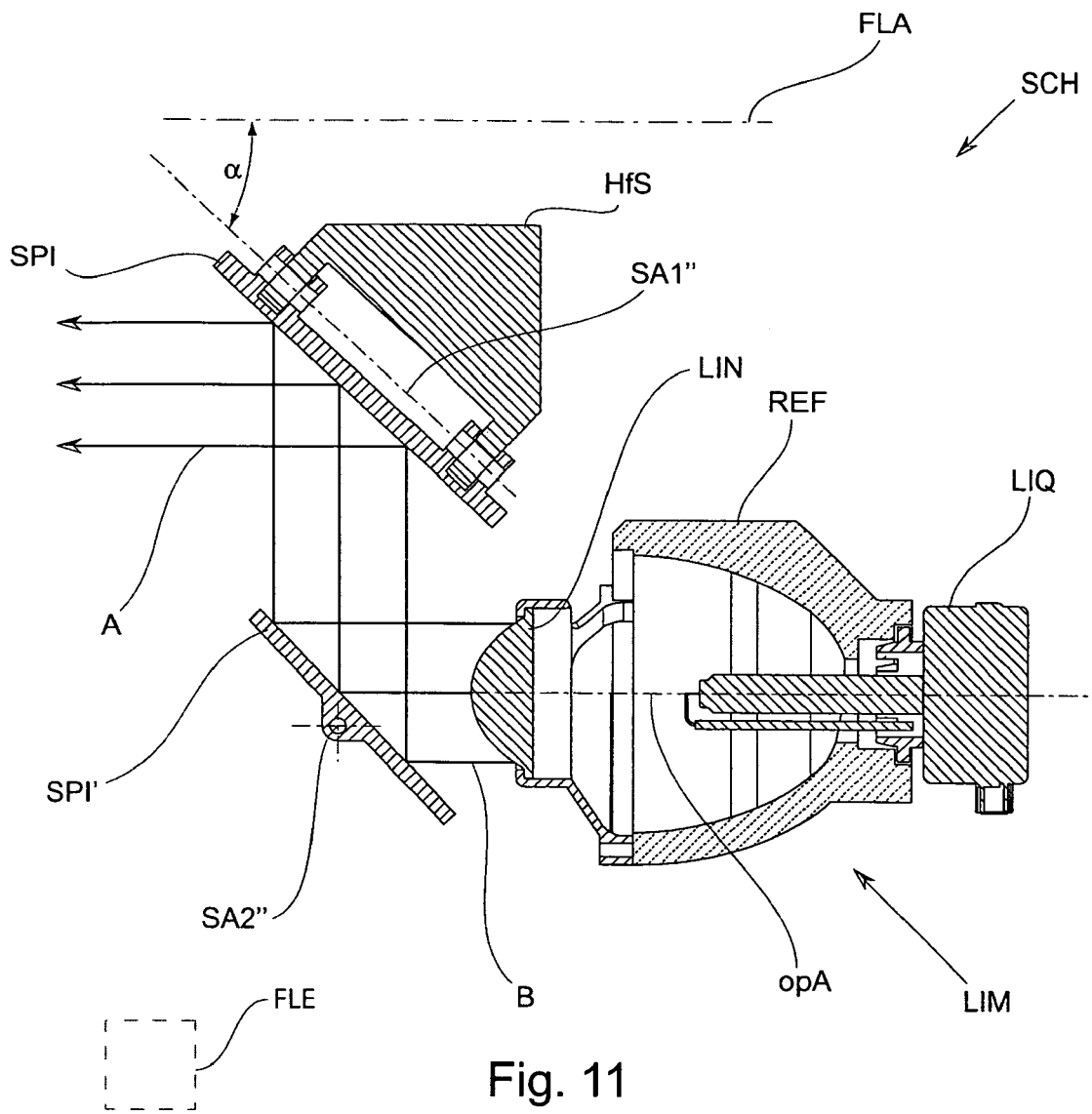
FIG. 11 is a third embodiment of an invention-based vehicle headlight.
Figure 12:
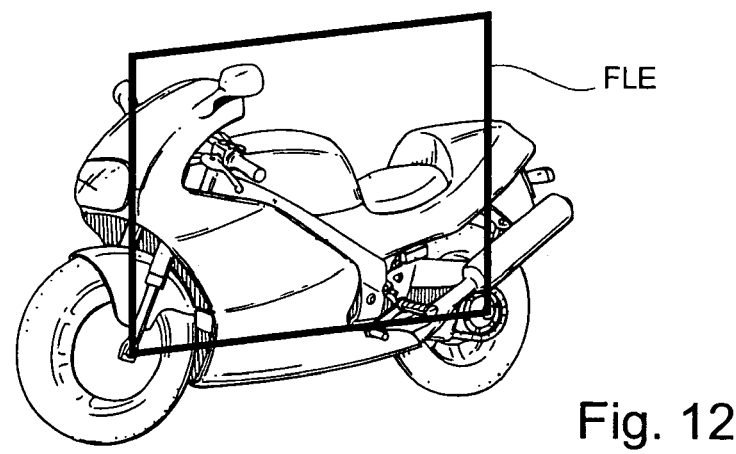
FIG. 12 is an illustration of the longitudinal vehicle midplane.

FIG. 11 finally shows a variant that differs from the embodiment shown in FIGS. 1 to 6 in that the reflection device SPI of course can be swung around a swing axis SA1" but not around another axis. To implement the light engineering requirements as in the embodiment of FIGS. 1 to 6, it is provided in this variant that there be arranged an additional reflection device SPI' that can be swung around a swing axis SA2", where this axis SA2" is positioned essentially perpendicularly with respect to the longitudinal vehicle midplane FLE. Light emerges from the light module LIM in the propagation direction B, it is deflected by the second reflection device SPI' upon the first reflection device SPI that can be swung around a swing axis SA1" (corresponding to the swinging action around the axis SA1 in FIGS. 1 to 6) and it is deflected by the latter into propagation direction A.

Here is the advantage inherent in this variant: the first reflection device SPI can be built shorter in the direction of light discharge as a result of which, one needs less structural space. Of course, in this case, one needs two mirrors SPI, SPI'.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What we claim is:

1. An illumination device for a single-track motor vehicle, the vehicle having a longitudinal vehicle midplane, the device emitting bundled light in the form of a light beam bundle which in a first propagation direction is directed at a roadway area located in front of the motor vehicle, whereby the illumination device comprises:
   a light module that emits light in a second propagation direction and where, in a beam path of the light emitted from the light module, there is arranged at least a first optical reflection device having a reflecting surface, and where the light emitted by the light module, first falls upon the optical reflection device and then is deflected by the latter into the first propagation direction, and
   the entire first optical reflection device can be swung around a first swing axis, where the first swing axis is essentially positioned in a plane that extends parallel to the longitudinal vehicle midplane or that is the longitudinal vehicle midplane.

2. The illumination device according to claim 1, wherein a projection of the first swing axis into the longitudinal vehicle midplane is inclined at an angle ($\alpha$) with respect to the longitudinal vehicle axis.

3. The illumination device according to claim 2, wherein the angle ($\alpha$) corresponds to roughly half an angle ($\delta$), which is formed by an optical axis of the light module with the longitudinal vehicle axis.

4. The illumination device according to claim 2, wherein a rearward end of the swing axis lies lower than a forward end thereof, when viewed in the direction of light discharge.

5. The illumination device according to claim 1, wherein the swing axis extends close to the reflecting surface or extends immediately through the surface of the first reflection device.

6. The illumination device according to claim 1, wherein the reflecting surface of the first reflection device is level and that the swing axis extends parallel to the surface of the first reflection device.

7. The illumination device according to claim 1, further including a second swing axis for the purpose of swinging the first reflection device, where the second swing axis is positioned essentially perpendicularly with respect to the longitudinal vehicle midplane.

8. The illumination device according to claim 1, wherein the first swing axis can be swung laterally out of the plane that is parallel to, or is, the longitudinal vehicle midplane, where at least one point on the swing axis remains in that plane.

9. The illumination device according to claim 8, wherein the first optical reflection device is rotatably positioned in a rear area facing toward the light module and is guided in a forward area in a guide, that an adjusting means engages on the first optical reflection device laterally outside the plane that is parallel to, or is, the longitudinal vehicle midplane and that the guide is such that in case of an adjustment action with the adjusting element, the first optical reflection device is rotated, on the one hand, around the swing axis and, on the other hand, that the first swing axis is rotated out of the plane around a rear pivot.

10. The illumination device according to claim 9, wherein the guide is U-shaped or V-shaped.

11. The illumination device according to claim 1, further including a second reflection device in the beam path of the light emitted from the light module, whereby the second reflection device can be swung around an axis that is essentially positioned perpendicularly with respect to the longitudinal vehicle midplane.

12. The illumination device according to claim 11, wherein the second reflection device is so arranged that light issuing in the second propagation direction (B) out of the light module first of all will hit the second reflection device, will be deflected by the latter upon the first reflection device and that light is radiated from the first reflection device in the first propagation direction (A) out of the illumination device.

* * * * *